July 22, 1941.  E. W. RIBLETT  2,250,421
METHOD OF CATALYTIC SYNTHESIS
Filed May 7, 1938
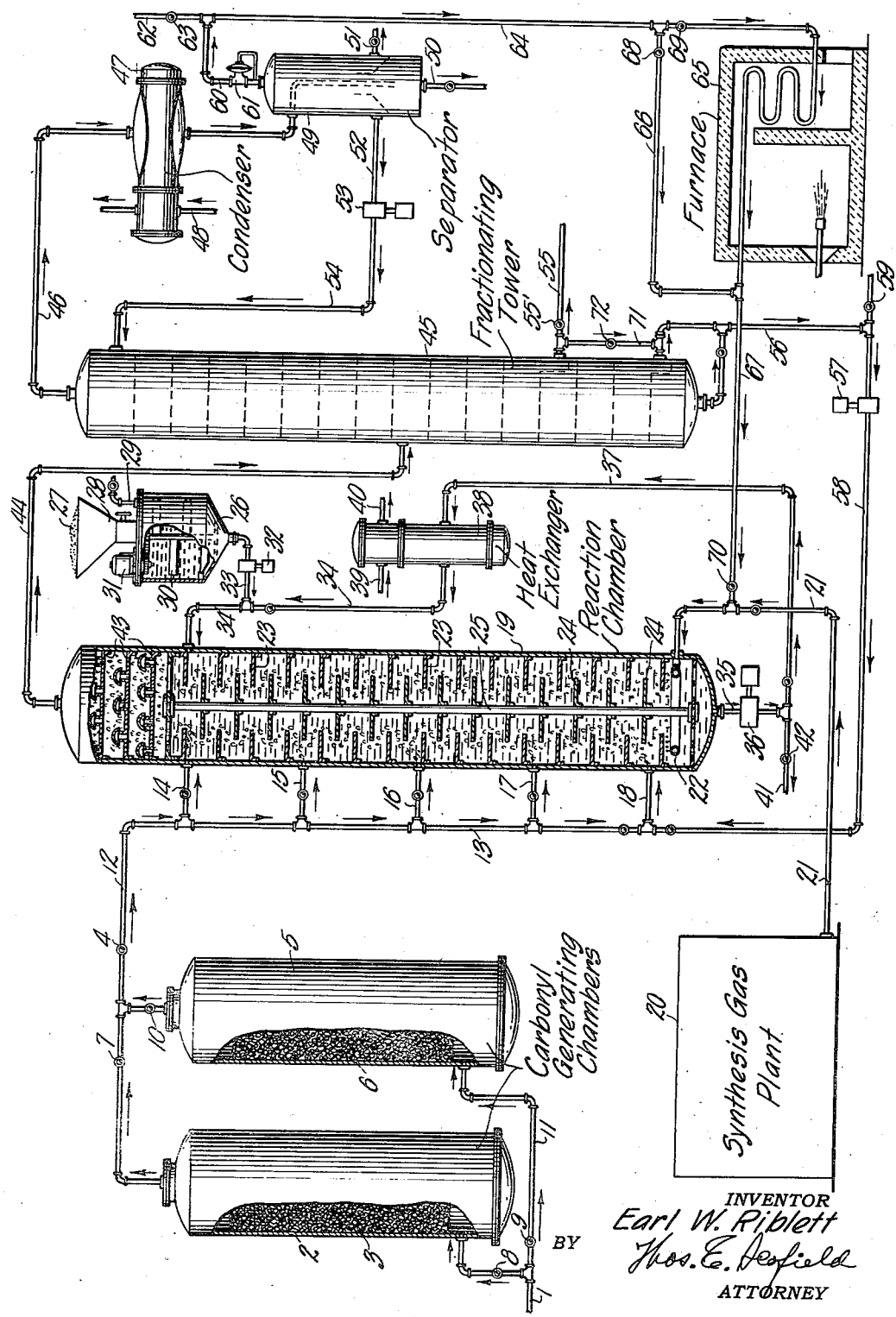
INVENTOR
Earl W. Riblett
BY
Thos. E. Desfield
ATTORNEY Patented July 22, 1941

2,250,421

UNITED STATES PATENT OFFICE 2,250,421

METHOD OF CATALYTIC SYNTHESIS

Earl W. Riblett, Teaneck, N. J., assignor to The M. W. Kellogg Company, New York, N. Y., a corporation of Delaware Application May 7, 1938, Serial No. 206,602

15 Claims. (Cl. 260—449)

My invention relates to a method of catalytic synthesis in general, and more particularly to a method of synthesizing liquid hydrocarbons from synthesis gas mixtures comprising carbon monoxide and hydrogen.

Most synthesis reactions are either exothermic or endothermic. In those synthesis reactions which are made possible by the action of a catalyst, the physical state of subdivision of the catalytic material has a marked influence on catalytic activity, it being found in general that the finer the state of subdivision of the catalyst, the higher its activity. Increased activity of the catalyst results in increased speed of the synthesis reaction. This in turn results in liberation of greater amounts of heat in the case of exothermic reaction, and in the greater absorption of heat in the case of an endothermic reaction.

In exothermic reactions, the greater amount of heat liberated, the greater the tendency of the finely divided catalyst to coalesce, so that it will appear that the greater the state of subdivision of a catalyst in an exothermic reaction, the greater will be its tendency toward coalescence.

By way of illustration, but not by way of limitation, I will describe my method of catalytic synthesis with respect to the synthesizing of liquid hydrocarbons from a mixture of carbon monoxide and hydrogen. This synthesis in the presence of a catalyst has been described in the literature. The synthesis reaction is

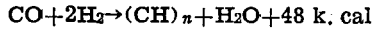

$$CO + 2H_2 \rightarrow (CH)_n + H_2O + 48 \text{ k. cal}$$

The reaction takes place at a temperature in the vicinity of 200° C. in the presence of nickel, cobalt, iron, or the like, catalysts. I have observed that the metals which exhibit the greatest catalytic activity toward the synthesis reaction are characterized by their ability to form carbonyls. These carbonyls are either readily volatile or may be easily volatilized by a stream of heated gas. In the gaseous phase the compound making up the vapors exists as individual molecules. In the instant case the metallic carbonyls will usually contain one atom of the metal for each molecule, and will never contain more than six atoms of metal per molecule. The metal carbonyls decompose at suitably low temperatures in the vapor phase to give carbon monoxide and the metal.

It will be clear, therefore, to those skilled in the art that the thermal decomposition of the gaseous metal carbonyls will give the metals themselves in the finest possible state of subdivision, namely, as atoms or of groups of not more than six atoms, enabling the ultimate in catalytic activity to be obtained.

In the case used for purposes of illustration, namely, the synthesis of liquid hydrocarbons from a mixture of carbon monoxide and hydrogen, the liberation of carbon monoxide upon the decomposition of a metal carbonyl is advantageous since carbon monoxide is one of the reactant gases.

One object of my invention is to provide a novel method of catalytic synthesis.

Another object of my invention is to provide a novel method of synthesizing liquid hydrocarbons from a mixture of carbon monoxide and hydrogen.

A further object of my invention is to provide a method of catalytic synthesis in which the temperature of the synthesis reaction may be closely controlled.

A still further object of my invention is to provide a novel method of catalytic synthesis in which the catalyst is passed as a colloidal suspension in extremely finely divided form.

Other and further objects of my invention will appear from the following description.

The accompanying drawing, which forms part of the instant specification, and which is to be read in conjunction therewith, is a diagrammatic view of one form of apparatus capable of carrying out the method of my invention.

More particularly, referring now to the drawing, carbon monoxide heated to a temperature between 80° F. and 250° F. from pipe 1 is introduced into a chamber 2 containing ceramic material or clay-like material 3 upon which has been deposited metal nickel. A valve 4 controls the pressure existing within the chamber 2. At atmospheric pressure the optimum temperature is about 125° F. By varying the pressure, varying temperatures may be used. The passage of carbon monoxide through the bed of nickel forms nickel carbonyl as a vapor (nickel carbonyl boiling at 110° F. at atmospheric pressure). It is to be understood, of course, that by suitable temperature and pressure conditions the carbonyls of any suitable metal such as iron, cobalt, chromium, molybdenum, tungsten, ruthenium and the like, may be made. If desired, two or more metal carbonyls may be made in the admixture.

In order to provide for a continuous process I provide a second chamber 5 containing a bed of metal 6, the carbonyl of which is to be formed. By closing valves 7 and 8, and opening valves 9 and 10, chamber 5 will receive the heated carbon monoxide from pipe 1 through pipe 11.

The gaseous carbonyl is withdrawn from the carbonyl generating chamber in use through pipe 12, and passes into a manifold 13 from which it is introduced through pipes 14, 15, 16, 17 and 18, controlled by respective valves, into a reaction or synthesis chamber 19. The reaction chamber 19 is filled with a high boiling hydrocarbon oil and is at a temperature between 350° F. and 450° F. at atmospheric pressure. At higher pressures, the temperature may be proportionately higher.

At the temperature existing within reaction chamber the nickel carbonyl will decompose into finely divided metal, forming a colloidal suspension with the oil and the carbon monoxide gas. The decomposition of the metal carbonyl will furnish carbon monoxide in intimate contact with the catalyst well dispersed throughout the oil. Synthesis gas from a synthesis gas plant 20 is introduced into the reaction chamber 19 through pipe 21 through a distributing manifold 22. This gas may be richer in hydrogen than is normally the case since a proportion of carbon monoxide is supplied by the decomposition of the nickel carbonyl. The reaction chamber 19 is provided with a plurality of annular baffles 23. A plurality of disc baffles 24 are supported by a rod 25 between the annular baffles to provide a circuitous flow for the reactant gases upwardly through the colloidal suspension of the catalyst.

Metallic catalysts frequently exhibit greater activity in the presence of promoting agents, such as alumina, thoria, ceria, manganese oxide, or combinations thereof, and the like. In order to introduce finely divided promoting agents of this character, I form a slurry of oil and the promoter in a mixing chamber 26. I introduce the finely divided promoter 27 through a hopper 28 into the mixing chamber into which hydrocarbon oil is introduced through pipe 29. In the mixing chamber agitating means 30 operated by electric motor 31 form a pumpable slurry. This slurry is pumped by pump 32 through pipe 33 into pipe 34 for introduction into the reaction chamber. In order to control the temperature of the reaction, I remove the suspension of metal and promoter in the oil from the reaction chamber 19 through pipe 35 and pump it by pump 36 through pipe 37, through heat exchanger 38, from which it is withdrawn through pipe 34 and reintroduced into the reaction chamber. A cooling medium is introduced into the heat exchanger through pipe 39 and removed therefrom through pipe 40. It is to be understood, of course, that in the case of endothermic reaction a heating medium may be introduced into pipe 39. From time to time, or continuously, if desired, a portion of the catalytic slurry pumped by pump 36 may be bled from the system through pipe 41 controlled by valve 42. From the slurry removed through pipe 41 are recovered those products which do not pass overhead through pipe 44. The apparatus utilized for the recovery of these products is not shown in the drawing in the interest of simplicity, but may include fractionating apparatus and equipment to dissolve the wax from the metal. The cleaned metal is returned to the carbonyl regenerating chambers.

In some instances it has been found advantageous to dispense with the hydrocarbon oil as a dispersing medium and contact the synthesis gases and carbonyl with the promoter in a synthesis chamber or zone through which the promoter is continuously moved. To pass the solid promoter material through the zone of reaction, it is preferably introduced at the top of the chamber and withdrawn from the bottom by use of proper mechanical devices.

In passing through the synthesis zone metal from the carbonyl will deposit on the solid promoter producing an extremely active catalyst. As the metal accumulates on the promoter the activity of the catalyst gradually decreases.

On discharge from the synthesis chamber the inactivated catalyst is conveyed to the chamber or zone in which the carbonyl is produced. In the production of carbonyl the metal deposited on the promoter is removed as carbonyl and the cleaned promoter returned to be used again in the synthesis. The carbonyl is mixed with the synthesis gas and is charged to the synthesis zone where it again is mixed with the promoter. Thus the process is not only continuous but the materials employed can be recycled for reuse and regenerated during their recirculation.

Heretofore, the beneficial effects of promoters have been considered in the art as residing in their dispersing action on the catalytic material, but my results indicate that there is also a definite chemical effect of the promoter. As evidence of this, a comparison of the hydrocarbons produced from cobalt promoted by alumina and cobalt promoted by manganese may be cited. The alumina promoted catalyst produces light oils, whereas the hydrocarbon produced from manganese promoted catalyst is principally wax. Thoria promoted catalyst, on the other hand, produces a product intermediate between that of the alumina and manganese promoted catalysts. The manganese functions as a polymerization agent for the unsaturated groups before desorption from the catalyst. Desorption from the alumina promoted catalyst apparently occurs much more readily and consequently the heavier or higher molecular weight molecules do not have an opportunity to form.

The following tests, indicative of the above results, were made on laboratory apparatus:

|  | Alumina promoted catalyst | Thoria promoted catalyst | Manganese promoted catalyst |
| --- | --- | --- | --- |
| Operating temp. °F | 400 | 420 | 420 |
| Gas rate, Liters/Gram., cobalt | 1 | 1 | 1 |
| Apparent density, catalyst | 0.5 | 0.5 | 0.5 |
| Specific gravity, product | 0.6908 | 0.7020 | 0.7377 |
| Cloud point °F |  | −20 | 100 |

The intimate contact of the reactant gases with the catalyst will form vapors of liquid hydrocarbons which rise upwardly from the catalytic slurry together with unreacted gases. A plurality of fractionating trays 43 are provided in the top of the reaction chamber 19 to knock down some of the entrained liquid. The vapors from the reaction chamber are withdrawn through pipe 44 and introduced into a fractionating tower 45.

The steam, unreacted gases and light hydrocarbon gases formed are withdrawn from the fractionating tower overhead through pipe 46 and introduced into a condenser 47 which is supplied a cooling medium through pipe 48. The condensate enters a separator 49 from which water is withdrawn through pipe 50. The light hydrocarbons suitable for use as motor fuel are withdrawn from the separator through pipe 51. A portion of the light hydrocarbons are removed from the separator 49 through pipe 52 and pumped by pump 53 through pipe 54 for introduction into the fractionating tower 45 as reflux. A medium oil is withdrawn from the tower 45 through pipe 55 controlled by valve 55'. Some of the finely divided nickel will be carried overhead with the vapor withdrawn from the reaction chamber 19. This finely divided nickel will be suspended in the heavy fraction which is withdrawn from the fractionating tower through pipe 56 and may be pumped by pump 57 through pipe 58 for introduction through pipe 18 into the reaction chamber 19, in order that the usable catalytic material may be re-employed. In order to increase the fluidity of the heavy fraction, a portion of the medium fraction withdrawn through pipe 55 may pass into pipe 56 through pipe 71, controlled by valve 72. If desired, the heavy fraction may be withdrawn from the system through pipe 59.

The unreacted gases are removed from the separator through pipe 60 controlled by pressure control valve 61. They may be vented to the atmosphere through pipe 62, controlled by valve 63. If desired, the unreacted gases may be recycled through pipe 64, either through furnace 65 or by-pass line 66 to line 67, whence they are introduced into pipe 21 leading the hot synthesis gas into the reaction chamber. The control of the temperature of the recycled gases may be easily accomplished by the manipulation of valves 68 and 69, so that accurate control of the temperature of the synthesis gas entering the reaction chamber may be readily accomplished. If the gases be too hot, valve 69 may be partially closed and valve 68 may be opened further. If the gases are not sufficiently heated, valve 68 may be further closed and valve 69 may be further opened, the final control of the temperature being governed by valve 70, determining the admixture of the recycled gas to the hot fresh synthesis gas passing into the reaction chamber.

It will be seen that I have accomplished the objects of my invention. I have provided a synthesis method in which a catalyst is employed whereby a finely divided metallic catalyst may be readily achieved, and this in a continuous manner. Not only is the finely divided catalyst continuously produced, but it is continuously produced in finely divided state within the reaction zone. The recirculation of the catalytic material suspended in semi-permanent suspension in oil enables me to accurately control the temperature of the catalytic reaction. Where the hydrocarbon liquid is not used, the rate of circulation of the dry solid promoter through the synthesis zone serves as a temperature control medium. Fresh catalytic material is constantly being introduced into the catalytic zone so that while I have minimized a decrease in catalytic activity, yet I am enabled to constantly supply fresh catalytic material.

In the event difficulties arise due to deposition of metal on the baffle plates in the reaction chamber 19, it is contemplated that the central support 25 may be rotated from a power means exterior of the tower and the baffles 24 shaped to scrape the deposited material and maintained in a suspended condition due to agitation produced by rotation of the central shaft. In order to accomplish this result it would be necessary only to mount the support in an upper and lower bearing and drive the shaft or support by means of gears through a horizontally positioned shaft entering the tower through a stuffing box. The details of the mechanism are not shown in the drawing as the practice is one well known in the art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a method of catalytic synthesis requiring the presence of finely divided metals, the steps of forming the metal carbonyl of the catalyst metal and passing the carbonyl into contact with an inert liquid maintained at temperatures sufficiently high to decompose the metal carbonyl into the metal and carbon monoxide whereby to form a colloidal suspension of the metal in said inert liquid, and conducting the synthesis reaction in the presence of the colloidal suspension of the catalyst thus formed.

2. A method as in claim 1 wherein said inert liquid is circulated from the synthesis zone through a heat exchange zone, and back to the synthesis zone.

3. A method as in claim 1 in which a finely divided clayey material is dispersed through said inert liquid along with the catalyst metal to act as a promoter.

4. In a method of synthesizing liquid hydrocarbons from a mixture of carbon monoxide and hydrogen, the steps of passing carbon monoxide over nickel to form nickel carbonyl, introducing said nickel carbonyl into a body of inert liquid at a temperature in the vicinity of 200° C. to decompose the nickel carbonyl into metallic nickel and carbon monoxide, introducing a mixture of carbon monoxide and hydrogen into said inert liquid in the presence of the finely divided nickel thus formed, withdrawing the reaction products and unreacted gases from the reaction zone, fractionating the withdrawn products, and recovering the desired liquid hydrocarbons.

5. A method as in claim 4 in which said inert liquid is continuously circulated from said body through a heat exchange zone and back to said body, and heat is removed from said circulating stream of inert liquid in said heat exchange zone.

6. A method as in claim 4 in which there is dispersed through said body of inert liquid a finely divided clay to act as a promoting agent for said metal catalyst.

7. A method as in claim 4 in which said inert liquid is a hydrocarbon oil.

8. In a method of synthesizing liquid hydrocarbons from a mixture of carbon monoxide and hydrogen, the steps of passing carbon monoxide over cobalt to form cobalt carbonyl, introducing said cobalt carbonyl into a body of inert liquid at a temperature in the vicinity of 200° C. to decompose the cobalt carbonyl into metallic cobalt and carbon monoxide, introducing a mixture of carbon monoxide and hydrogen into said inert liquid in the presence of the finely divided cobalt thus formed, withdrawing the reaction products and unreacted gases from the reaction zone, fractionating the withdrawn products, and recovering the desired liquid hydrocarbons.

9. A method as in claim 8 in which said inert liquid is continuously circulated from said body through a heat exchange zone and back to said body, and heat is removed from said circulating stream of inert liquid in said heat exchange zone.

10. A method as in claim 8 in which there is dispersed through said body of inert liquid a finely divided clay to act as a promoting agent for said metal catalyst.

11. A method as in claim 8 in which said inert liquid is a hydrocarbon oil.

12. In a method of synthesizing liquid hydrocarbons from a mixture of carbon monoxide and hydrogen, the steps of passing carbon monoxide over iron to form iron carbonyl, introducing said iron carbonyl into a body of inert liquid at a temperature in the vicinity of 200° C. to decompose the iron carbonyl into metallic iron and carbon monoxide, introducing a mixture of carbon monoxide and hydrogen into said inert liquid in the presence of the finely divided iron thus formed, withdrawing the reaction products and unreacted gases from the reaction zone, fractionating the withdrawn products, and recovering the desired liquid hydrocarbons.

13. A method as in claim 12 in which said inert liquid is continuously circulated from said body through a heat exchange zone and back to said body, and heat is removed from said circulating stream of inert liquid in said heat exchange zone.

14. A method as in claim 12 in which there is dispersed through said body of inert liquid a finely divided clay to act as a promoting agent for said metal catalyst.

15. A method as in claim 12 in which said inert liquid is a hydrocarbon oil.

EARL W. RIBLETT.